United States Patent [19]
Stephan

[11] 3,809,381
[45] May 7, 1974

[54] LIME OXYGEN-NATURAL GAS DISTRIBUTION SYSTEM

[75] Inventor: Raymond C. Stephan, Gary, Ind.

[73] Assignee: United States Steel Corporation, Pittsburgh, Pa.

[22] Filed: July 10, 1972

[21] Appl. No.: 271,094

[52] U.S. Cl. .................................... 266/35, 266/41
[51] Int. Cl. ............................................ C21c 5/48
[58] Field of Search ........ 75/51, 52, 59, 60; 266/35, 266/36 P, 41

[56] References Cited
UNITED STATES PATENTS
560,414   5/1896   Koneman ............................. 266/35
3,330,645   7/1967   Moustier et al. ................. 266/35 X Primary Examiner—Gerald A. Dost
Attorney, Agent, or Firm—Forest C. Sexton

[57] ABSTRACT

A distribution system for supplying an oxygen-lime mixture to the tuyeres in a bottom blown steel refining vessel having a closed continuous oxygen-lime feed line encircling said tuyeres below the vessel bottom, and a plurality of individual conduit means to convey the oxygen-lime mixture from the closed continuous feed line to the individual tuyeres. In order to maintain a substantially uniform oxygen pressure and lime feed rate to each tuyere, the closed continuous feed line is provided with at least two inlet means uniformly spaced along said closed continuous feed line for supplying fresh oxygen-lime mixtures thereto.

5 Claims, 2 Drawing Figures

PATENTED MAY 7 1974　　　　　　　　　　　　　3,809,381

3,809,381

LIME OXYGEN-NATURAL GAS DISTRIBUTION SYSTEM

BACKGROUND OF THE INVENTION

A relatively new process for making steel, the bottom blown oxygen steelmaking process developed in Germany, is beginning to receive considerable attention in the United States. This new process has decided advantages over the conventional open hearth process, and even the more recent top blown basic oxygen process (BOP process) which is currently replacing many open hearth shops. Like the more conventional BOP process, the new bottom blown oxygen process (now called Q-BOP process for "quality-basic oxygen process") is a basic process utilizing a combination of an oxygen blow and a lime-containing basic slag to remove the impurities from the molten pig iron. Unlike the BOP process, however, the Q-BOP process blows oxygen upward through tuyeres below the molten metal surface. Each oxygen tuyere is surrounded by a larger concentric tuyere for the simultaneous injection of a shielding gas which can be natural gas, propane or other hydrocarbon, hydrogen, nitrogen, argon, ammonia, carbon monoxide, carbon dioxide, etc. This shielding gas acts as a coolant and delays the contact between oxygen and molten metal, reducing the rate of reaction between the molten metal and the oxygen adjacent to the tuyeres, preventing rapid erosion of the tuyeres and adjacent refractory materials. Preferably, lime powder is entrained in the oxygen and blown into the bath to flux the impurities oxidized from the molten iron.

The typical Q-BOP vessel is provided with six tuyeres through the bottom uniformly arranged in a circular pattern around the vertical axis of the vessel. In order to assure a uniform oxygen pressure and lime content to each tuyere the lime entrained oxygen is first fed into an elongated cylindrical distribution manifold axially secured at the base of the vessel equidistant to each tuyere. The manifold may have a cylindrical or annular chamber such that the incoming flow will circulate therearound. Individual radial pipes from the manifold feed each tuyere as much by centrifugal force as by pressure thus assuring uniform lime content. The shielding gas is fed to each tuyere individually from a ring pipe circumscribing the tuyeres.

Although the above distribution system does provide a uniform feed to each tuyere, it is rather complicated considering the small area involved, and hence considerable difficulties have been experienced. Specifically, since the distribution manifold must feed all tuyeres, it must necessarily be rather large consuming most of the space inside the tuyere circle. In fact, the tuyeres are so closely spaced to the manifold that service work thereon is greatly complicated, and of course, lengthens the down-time for such service work. Individual tuyeres that are showing excessive wear can be plugged and individual oxygen pipes can be stopped with flange plates with some difficulty. However, when one tuyere burns through and metal drains from the remaining hole, the extent of damage to other tuyere piping and the lime distribution system in the present system requires that the entire tuyere plug with distribution system be removed and replaced.

SUMMARY OF THE INVENTION

An object of this invention is to provide a simplified tuyere distribution system for a Q-BOP vessel utilizing only standard components which will allow easy access to the tuyeres for service purposes and yet will provide uniform gas pressures and lime quantity to each tuyere.

Another object of this invention is to provide an inexpensive tuyere distribution system for a Q-BOP vessel constructed only of pipes, couplings and elbows and having no special parts requiring casting and machining.

A further object of this invention is to provide a tuyere distribution system for a Q-BOP vessel having a lower profile to optimize clearances below the vessel.

DESCRIPTION OF THE PREFERRED EMBODIMENT

Figure 1:
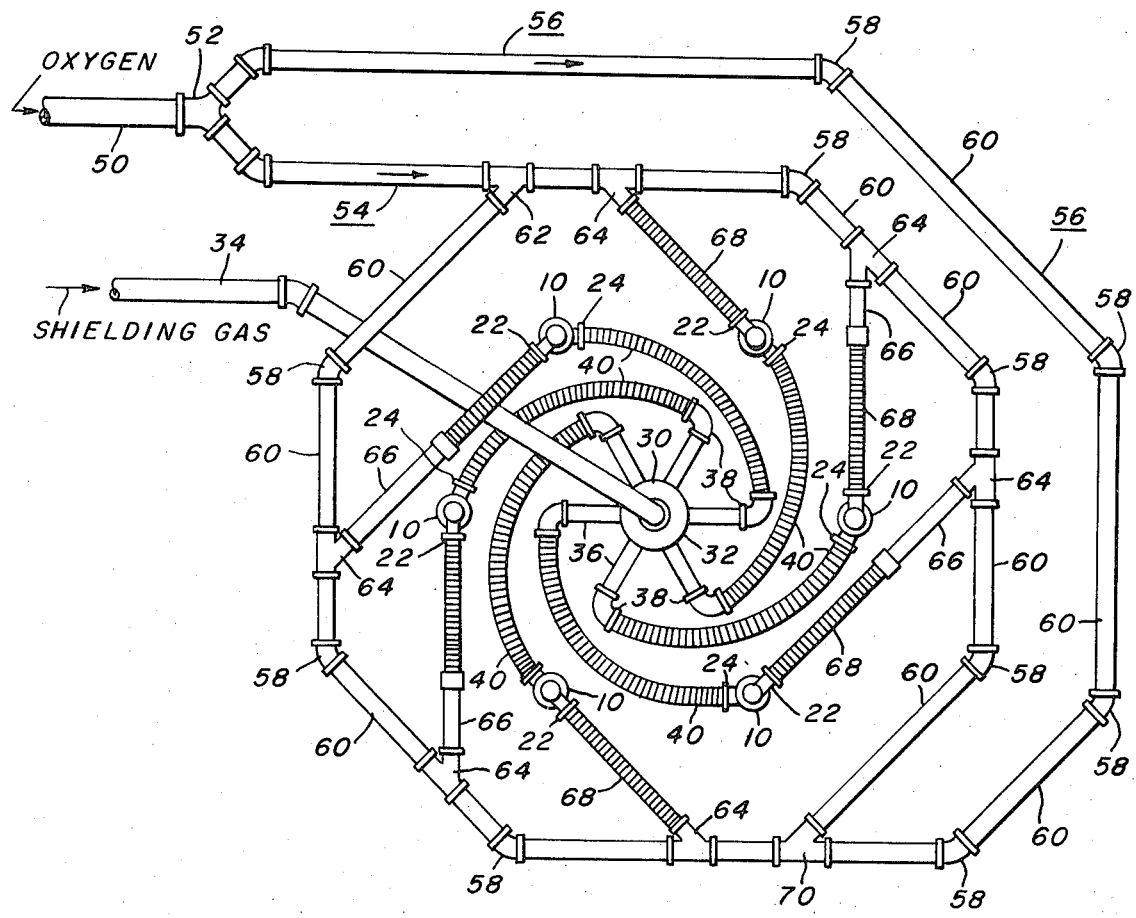
FIG. 1 is a plan view of one embodiment of a tuyere distribution system for a Q-BOP vessel according to this invention.
Figure 2:
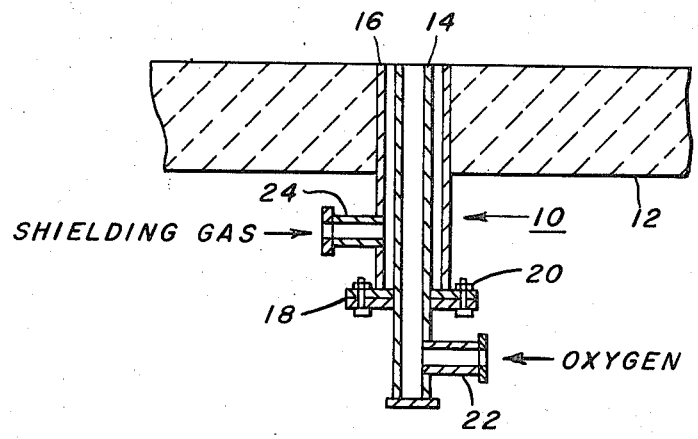
FIG. 2 is a sectional side view of the tuyeres shown in FIG. 1.

With reference to FIG. 1, one embodiment of this invention comprises a plurality of tuyeres 10 uniformly spaced in a circular pattern and extending through the bottom 12 (FIG. 2) of the Q-BOP vessel (not shown). Although six tuyeres 10 are utilized in the embodiment shown, more or less tuyeres could be used in circular or non-circular patterns. As shown in FIG. 2 each tuyere 10 consists of central tuyere pipe 14 for injection of the oxygen and lime, and a larger peripheral tuyere pipe 16 for injection of the shielding gas. The two tuyere pipes 14 and 16 are held together at flanges 18 by nuts and bolts 20. Oxygen is admitted to the central tuyere pipe via inlet 22, while the shielding gas is admitted to the peripheral tuyere pipe 16 via inlet 24.

With reference to FIG. 1, a low-profile, cylindrical gas chamber 30 is secured to the bottom of the vessel at the axis thereof equally spaced from the surrounding tuyeres 10. Gas chamber 30 is preferably fabricated from a short section of steel pipe having circular end plates 32 welded thereto. Shielding gas is fed into gas chamber 30 through the main shielding gas line 34 which enters gas chamber 30 through the center of the outer end plate 32. The shielding gas is then conveyed to the shielding gas inlet 24 on each tuyere 10 through chamber outlet pipes 36, 90°-elbows 38, and flexible feed pipes 40 which are flexed counterclockwise to inlets 24 on tuyeres 10.

The oxygen or lime entrained oxygen enters the distribution system through the main oxygen line 50 whereupon the main oxygen flow is split into two lines by Y-coupling 52 to provide inner and outer oxygen feed lines 54 and 56 respectively. Using a plurality of 45°-elbow pipe couplings 58 and straight lengths of pipe 60, both oxygen feed lines 54 and 56 commence to encircle the tuyeres 10. The inner oxygen feed line 54 has an octagonal shape completely encircling tuyeres 10 to form a continuous clockwise line by returning to the main line at Y-coupling 62. Six different Y-couplings 64 are suitably positioned around the inner oxygen feed line 54 to supply oxygen and lime to the tuyeres 10 via flexible pipes 68. The outer oxygen feed line 56 only partially encircles the tuyeres 10 and feeds into the inner oxygen feed line 54 at Y-coupling 70. It should be noted that the inner oxygen feed line 54 feeds half of the tuyeres 10 before the outer oxygen feed line 56 joins therewith, and the other half of the tuyeres 10 thereafter.

To simplify construction of the above distribution system, all flexible pipes 40 and 68 are of equal length so that only one size need be obtained. This will require however that the short lengths of pipe 66, feeding into flexible pipes 68, must be of different lengths. This results because there are only six tuyeres 10 but eight sides to the octagonal shaped inner oxygen feed line 54. The configuration of the system would of course be more uniform if the inner oxygen feed line 54 has the same number of sides as there are tuyeres 10, in this case, six. The inner oxygen feed line 54 was made octagonal however instead of hexagonal merely because of the ready availability of 45° elbows 58. Obviously therefore, feed line 54 could assume any configuration as may be desired.

In operation, the distribution system works substantially as is obvious from the above physical description. The oxygen and lime mixture is fed to each tuyere 10 from the inner oxygen feed line 54 through Y-couplings 64 and flexible pipe 68. After the first three pipes have been supplied, the line pressure would of course drop appreciably. However, the line pressure is restored after the third tuyere by emergence of the feed from the outer oxygen feed line 56. Therefore, the oxygen pressure and lime feed rate is sufficiently uniform at each tuyere 10 to prevent complications. Since the inner oxygen feed line 54 forms a closed loop, there are no dead-ends where the powdered lime could collect. In addition, Y-couplings 64 are positioned along straight lengths of pipe 60, so the centrifugal forces are less likely to force the powdered lime to the outside of the feed line 54 and hence away from the take-off portion of Y-couplings 64. It is readily seen that the shielding gas will enter the gas chamber 30 through the main line 34, and will then be distributed at a uniform pressure to each tuyere 10 via the radial outlet pipes 36 and flexible pipes 40.

The substantial open construction as described above will permit easy maintenance of the system utilizing standard components.

Although the above embodiment has been described in substantial detail, it is obvious that a great number of modifications could be made thereto without departing from the principal inventive concepts. The essence of the invention is to provide a closed continuous oxygen-lime feed line 54 around the tuyeres 10 below the Q-BOP vessel bottom. The feed through said line may move either clockwise or counterclockwise. The plurality of tuyeres 10 whether in a circular configuration or otherwise are then individually fed from this closed continuous oxygen-lime feed line 54. In order to substantially equalize oxygen pressures and lime rates to each tuyere 10, the closed continuous oxygen-lime feed line is provided with at least two means for supplying fresh oxygen-lime mixtures thereto, substantially equal spaced along said closed continuous line. In the embodiment described two such means were provided being substantially diametrically opposed. Obviously three or more could be provided if equally spaced to provide a balanced distribution to the tuyeres. Although the above embodiment was directed to a Q-BOP vessel having six tuyeres arranged in a circular configuration, the same inventive concept could be utilized with more or less tuyeres, or if different configurations were employed.

I claim:

1. In a Q-BOP steel refining vessel having a plurality of tuyeres through the bottom thereof for blowing oxygen entrained with powdered lime upward into a hot metal charge and simultaneously blowing a shielding gas concentrically around the oxygen-lime blow, a distribution system for supplying said oxygen, lime and shielding gas to said tuyeres comprising an oxygen-lime feed line encircling said tuyeres beneath the vessel bottom to form a closed-continuous conduit means, a plurality of individual conduit means spaced along said oxygen-lime feed line to convey the oxygen-lime mixture from said oxygen-lime feed line to the individual tuyeres, at least two means for supplying fresh oxygen-lime mixtures to said oxygen-lime feed line, substantially uniformly spaced along said oxygen-lime feed line, and a means for supplying the shielding gas to said tuyeres.

2. A distribution system according to claim 1 in which said means for supplying the shielding gas to said tuyeres comprises a cylindrical manifold axially secured to the bottom of the refining vessel having an axial inlet for admitting the shielding gas thereto, a plurality of radial outlets, and a conduit means connecting each radial outlet to an individual tuyere to convey the shielding gas to the tuyeres.

3. A distribution system according to claim 2 in which said conduit means connecting each radial outlet to an individual tuyere comprises a flexible pipe.

4. A distribution system according to claim 1 in which said oxygen-lime feed line consists of a plurality of straight lengths of pipe joined together to form the closed configuration by a plurality of elbow pipe couplings and at least two Y-pipe couplings, said Y-pipe couplings comprising said means for supplying fresh oxygen-lime mixture to said oxygen-lime feed line.

5. A distribution system according to claim 4 in which each of said plurality of individual conduit means spaced along said oxygen-lime feed line comprises a Y-pipe coupling inserted on the oxygen-lime feed line and a flexible pipe connecting said Y-pipe coupling to an individual tuyere to convey the oxygen-lime mixture to the tuyere.

* * * * *